(12) United States Patent
Higgins et al.

(10) Patent No.: US 7,873,491 B2
(45) Date of Patent: Jan. 18, 2011

(54) AC MAGNETIC TRACKING SYSTEM WITH NON-COHERENCY BETWEEN SOURCES AND SENSORS

(75) Inventors: Robert F. Higgins, Richmond, VT (US); Herbert R. Jones, Jr., Williston, VT (US); Allan G. Rodgers, Jericho, VT (US)

(73) Assignee: Alken, Inc., Colchester, VT (US)

( * ) Notice: Subject to any disclaimer, the term of this patent is extended or adjusted under 35 U.S.C. 154(b) by 388 days.

(21) Appl. No.: 12/017,392

(22) Filed: Jan. 22, 2008

(65) Prior Publication Data

US 2008/0120061 A1 May 22, 2008

Related U.S. Application Data

(63) Continuation-in-part of application No. 11/147,888, filed on Jun. 8, 2005, now abandoned.

(60) Provisional application No. 60/577,860, filed on Jun. 8, 2004.

(51) Int. Cl.
*G06F 19/00* (2006.01)

(52) U.S. Cl. ............................ 702/150; 702/75; 33/361

(58) Field of Classification Search ......... 702/150–153, 702/66, 69, 72, 73, 75, 89, 104; 324/207.17, 324/207.11, 207.15, 244, 417, 448, 450, 324/451, 453, 458; 33/319, 355 R, 361; 600/453, 458

See application file for complete search history.

(56) References Cited

U.S. PATENT DOCUMENTS 4,054,881 A * 10/1977 Raab .......................... 342/448

| | | | |
|---|---|---|---|
| 4,287,809 A | 9/1981 | Egli et al. | |
| 4,314,251 A | 2/1982 | Raab | |
| 4,394,831 A | 7/1983 | Egli et al. | |
| 4,737,794 A | 4/1988 | Jones | |
| 5,453,686 A | 9/1995 | Anderson | |
| 5,640,170 A | 6/1997 | Anderson | |
| 5,645,077 A | 7/1997 | Foxlin | |
| 5,752,513 A | 5/1998 | Acker et al. | |
| 5,831,260 A | 11/1998 | Hansen | |
| 6,188,355 B1 | 2/2001 | Gilboa et al. | |
| 6,288,785 B1 | 9/2001 | Frantz et al. | |
| 2005/0062469 A1 | 3/2005 | Anderson | |
| 2005/0104776 A1 | 5/2005 | Anderson | |

* cited by examiner

*Primary Examiner*—Manuel L Barbee
(74) *Attorney, Agent, or Firm*—Gifford, Krass, Sprinkle, Anderson & Citkowski, P.C.

(57) ABSTRACT

In an AC magnetic tracker one or more multi-axis field sources, each operating at a different frequency, or frequency set, are detected and tracked in three-dimensional space, even when wireless or otherwise not physically connected to the tracking system. Multiple sources can be tracked simultaneously as they each operate with their own unique detectable set of parameters. The invention not only provides the ability to uniquely identify one or more sources by their frequencies, but also to synchronize with these frequencies in order to measure signals that then allow tracking the position and orientation (P&O) of the source(s). Further, these sources need not be present at the time of system start-up but can come and go while being detected, discriminated and tracked. It also should be noted that application of such systems in multiples with more sensors not synchronized to a source or sources also could be employed to give the reverse appearance of a known source phase and incoherency with the sensors.

15 Claims, 5 Drawing Sheets

AC MAGNETIC TRACKING SYSTEM WITH NON-COHERENCY BETWEEN SOURCES AND SENSORS

REFERENCE TO RELATED APPLICATIONS

This application is a continuation-in-part of U.S. patent application Ser. No. 11/147,888, filed Jun. 8, 2005, which claims priority to U.S. Provisional Patent Application Ser. No. 60/577,860, filed Jun. 8, 2004, the entire content of each of which is incorporated herein by reference.

FIELD OF THE INVENTION

This invention relates generally to AC magnetic tracking systems and, in particular, to detecting and establishing phase coherency between magnetic signal sources and sensors.

BACKGROUND OF THE INVENTION

Position and orientation tracking systems ("trackers") are well known in the art. For example, U.S. Pat. Nos. 4,287,809 and 4,394,831 to Egli et al.; U.S. Pat. No. 4,737,794 to Jones; U.S. Pat. No. 4,314,251 to Raab; and U.S. Pat. No. 5,453,686 to Anderson, are directed to AC electromagnetic trackers. U.S. Pat. No. 5,645,077 to Foxin discloses an inertial system, and combination systems consisting of two different trackers, such as optical and magnetic, are described in U.S. Pat. No. 5,831,260 to Hansen and U.S. Pat. No. 6,288,785 B1 to Frantz et al. Other pertinent references include U.S. Pat. No. 5,752,513 to Acker et al. and U.S. Pat. No. 5,640,170 to Anderson.

In the classical AC magnetic tracking system there typically is a single, static source of the three-axis fields which can be detected by multiple sensors which are free to move about a nearby volume (FIG. 1). Past magnetic systems wishing to cover more distance have created a larger source and driven it at high energy levels and then often even enlarged on that. This approach (see FIG. 2) always has proved difficult since the magnetic near field drops off as the third order of range from the source. That is, the signal is proportional to $1/r^3$.

Another factor is the error signal caused by magnetic signals creating responses that distort data because of eddy currents induced in nearby conductive materials. Although there is controversy over whether distortion is less or greater for pulsed DC or for AC magnetic trackers, in general there is very little difference if the objective is to obtain updates of tracking data very rapidly where stretching of the pulsed DC cycle to allow transients to decay prior to data collection is not allowed.

Although the desired direct magnetic signal and the eddy current distortion signal in theory maintain a constant ratio with energy level, there is a nonlinear phenomenon which alters this constant ratio. When operating at or above the signal level where the nonlinearity occurs, proportionality holds. Consequently, increasing source drive in order to increase operating range creates no benefit over most of the volume because distortion continues as a serious problem. Hence, a large magnetic field source is quite limited in extending operating range. Reversal of the source and sensor roles here offers an alternative for covering a larger volume.

If the source drive level is kept low such that the effects of secondary fields from eddy currents tends to fall at or below the noise floor of the sensing circuitry, that is the source-sensor coupling range is kept short, distortion is rarely a significant problem. In short, the nonlinearity of the noise floor acts as a natural "filter" against the weaker eddy current fields, which must cover much more distance to where the eddy currents are generated and onward to the sensor than does the direct signal. Therefore, if we were to distribute multiple sensors along the periphery of a volume that exceeds the normal source-sensor operating range, then a small, low power source acting as a "sensor" offers the opportunity to track an object over a large volume (see FIG. 3) without eddy current distortion being a derogatory factor.

Of course, operation of several static sensors in order to track a source pseudo-"sensor" raises the issue of maintaining several movement reference points in the volume. That is, there can be one at each sensor. The track of position and orientation (P&O) reported out to the host computer must be referenced to a common point. This point could be one of the sensors or some arbitrary point known by the system. Fortunately, referencing movement back to a common point is a relatively simply geometry problem with somewhat more complex bookkeeping of the various known sensor data points and the computation of track data. The benefits that make this worthwhile are avoidance of raising eddy current distortion and still maintaining strong signals throughout a large volume.

What makes this tracking over a larger area difficult is the incoherency of signal frequencies between a remote wireless source and the tracking sensor(s). Tracking of both regimes of sensors from a source and sources from one or more sensors (FIG. 4) has been done for many years as long as they are connected to a single set of electronics. However, existing systems do not provide the freedom to move through a 3D volume with or without being wired.

Initial landmark AC tracker literature made no distinction between whether the source or the sensors were static or moving. It simply states that the position and orientation (P&O) reported was the P&O relative to each other. In some later disclosures the concept of making the source(s) move and leaving the sensor(s) static was given innovative stature nevertheless. However, the systems cited remained tethered through cabling and greatly simplified the engineering problem of signal detection, synchronization and tracking.

The advent of microcircuits improved battery longevity and more sensitive receiving circuitry as well as providing significantly more cost effective processing. This has made possible wireless field sources which can generate detectable signals of sufficient strength for tracking and do so for at least an hour before battery re-charging. The consequence of this situation is that small 3-axis field sources now offer a way to achieve wireless P&O tracking without the need of radio links if on-the-fly signal detection and synchronization can be provided for small wireless field sources.

Several previous patents deal with tracking the movement of passive sensors relative to a stationary source of AC magnetic fields. U.S. Pat. No. 4,054,881 to Raab is one example, Tracking of remote sources with sensors is one subject of U.S. Pat. No. 6,188,355 to Gilboa. Gilboa also discusses the source being wireless under several constraints for achieving synchronization between the source signals and the sensors. In one embodiment there is a requirement to switch the wireless source and the tracking sensors back and forth between transmit and receive in order to obtain synchronization between them. In another embodiment there is a requirement that the three frequencies generated, one for each leg of the transmitting coil, be harmonically related. In yet another embodiment reception of a threshold triggering event at the wireless source in order to start all transmitted signals in unison is explained. These constraints, plus a requirement to perform calibrations at over 32 position and 32 orientation settings, leads to significant complexity, considering that phase adjustments are subject to drift over time.

SUMMARY OF THE INVENTION

In an AC magnetic tracker this invention broadly enables one or more multi-axis field sources, each operating at a different frequency, or frequency set, to be detected and tracked in three-dimensional space, even when wireless or otherwise not physically connected to the tracking system. Multiple sources can be tracked simultaneously as they each operate with their own unique detectable set of parameters.

According to a preferred method, three transmitted frequencies are computed at a receiver having three receiver coils, resulting in nine complex numbers, each with real and imaginary components. The phase of each frequency is rotated to remove its imaginary component and apply the correct sign to its real component. The frequencies are summed by restricting the complex values to two quadrants to avoid cancellation, resulting in eight possible phase combinations. The four phase combinations that lead to phase-adjusted matrices with a negative determinant are eliminated, as are three of the remaining four possible combinations that lead to phase-adjusted matrices which are rotated 180 degrees in azimuth, elevation, or roll. The position and orientation (P&O) of the receiver is then computed using the remaining phase-adjusted matrix.

The step of eliminating three of the four combinations is preferably based upon a procedure invoked during system initialization. For example, the method may further include the steps of orientating the transmitter and receiver to a known condition with wide tolerances; computing the P&O for the remaining four possible phase-adjusted matrices; and using the matrix that with the P&O solution having the best match to the correct transmitter phases. The transmitter and receiver are preferably oriented at ±90 degrees.

The method may further include the step of updating the identification of the remaining matrix between P&O solutions to compensate for phase drift. The nine complex numbers may be arranged as a matrix, with rows being indicative of receiver coil and column being indicative of frequency. The remaining phase-adjusted matrix may be determined by controlling the manufacturing process such that all magnetic sources have the same physical parameters.

The invention not only provides the ability to uniquely identify one or more sources by their frequencies, but also to synchronize with these frequencies in order to measure signals that then allow tracking the position and orientation (P&O) of the source(s). Further, these sources need not be present at the time of system start-up but can come and go while being detected, discriminated and tracked.

A source may be tracked if it is wireless and battery-operated or powered by another system due to the ability to synchronize and achieve coherency. Also, due to the reciprocity between 'sources' and 'sensors' as discussed above, inverse operation is also possible; that is, where it is desirable to synchronize one or more sensors with a source having a known phase.

DETAILED DESCRIPTION OF THE INVENTION

If one desires a remote "sensor" to track, it really does not matter whether the source or sensor is tracked because the P&O calculation is the relative position and orientation between source and sensor. If adequate sensitivity and low noise performance can be achieved with the sensor and a means can be found to determine the source frequency/frequency set and become synchronized with this external source of orthogonal fields, then the source can be remotely disposed as a "pseudo-sensor." Furthermore, once this is accomplished and there is no constraint placed on the source signals except that they create signals from a frequency population consistent with the system, there can be sources both wireless and wired being tracked as pseudo-sensors. Applicable wireless configurations are disclosed in U.S. patent application Ser. No. 11/147,977, the entire content of which is incorporated herein by reference.

Figure 1:
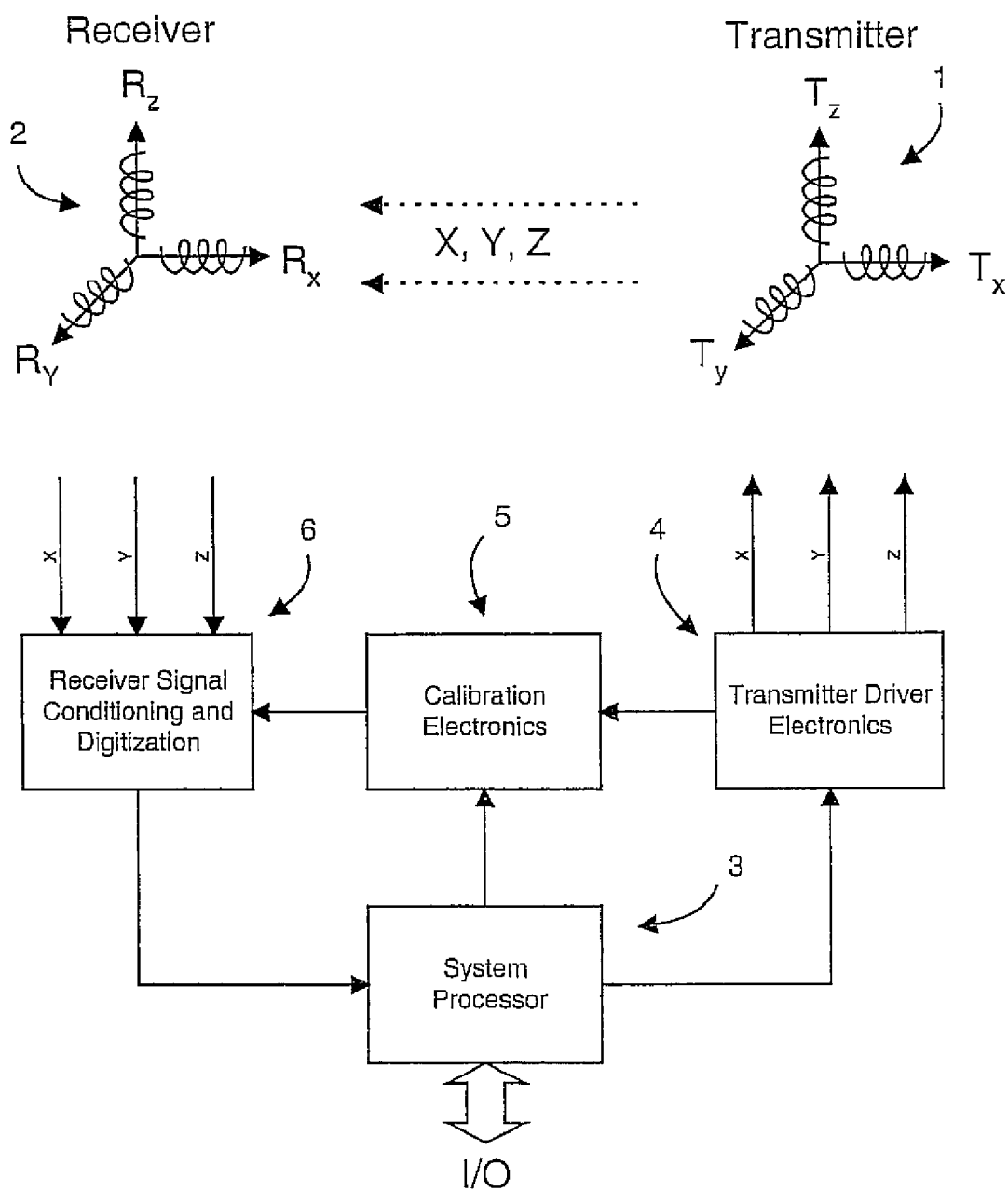
FIG. 1 is a block diagram of a typical AC magnetic tracking system.
Figure 2:
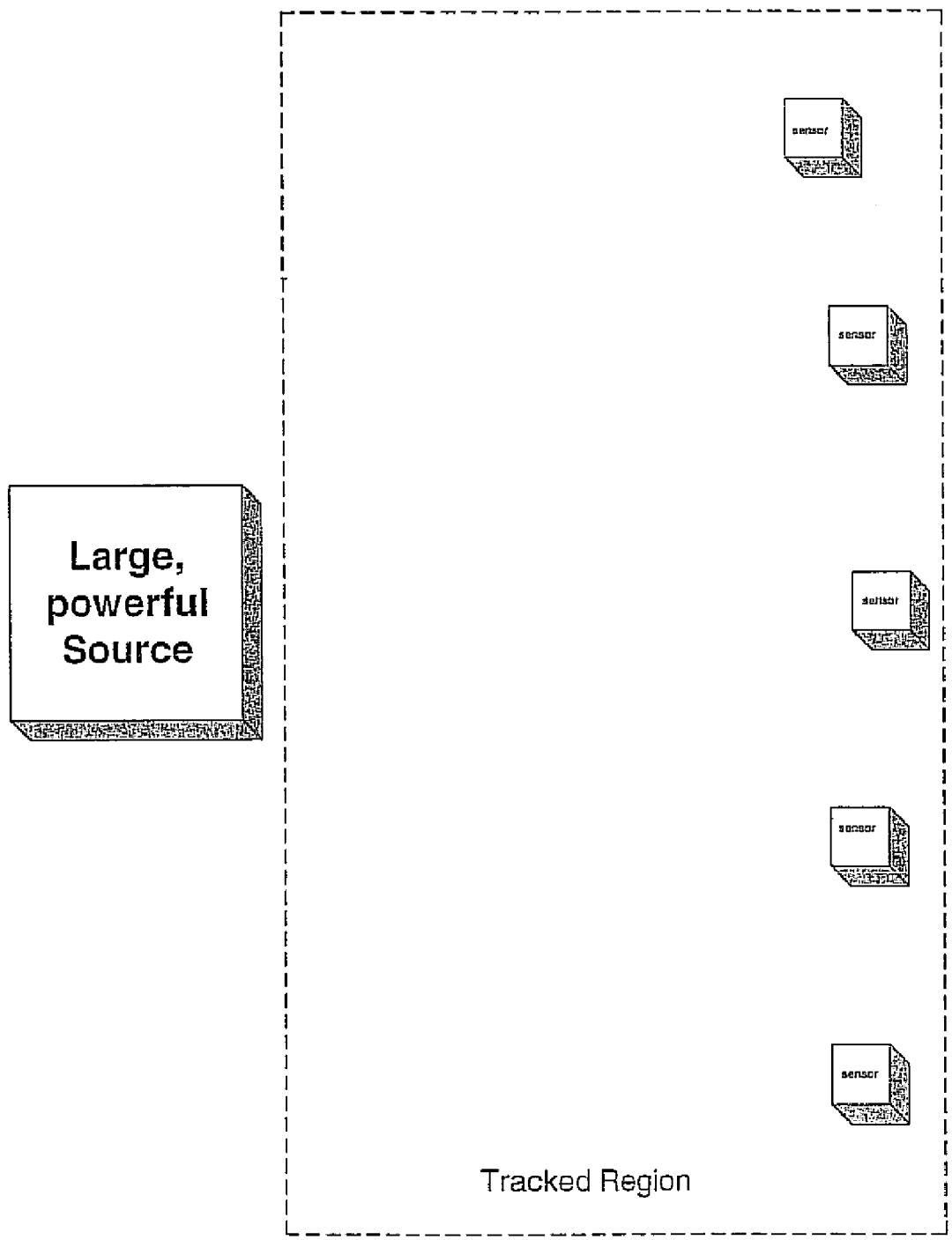
FIG. 2 is a block diagram showing how past magnetic systems wishing to cover more distance have created a larger source and driven it at high energy levels.
Figure 3:
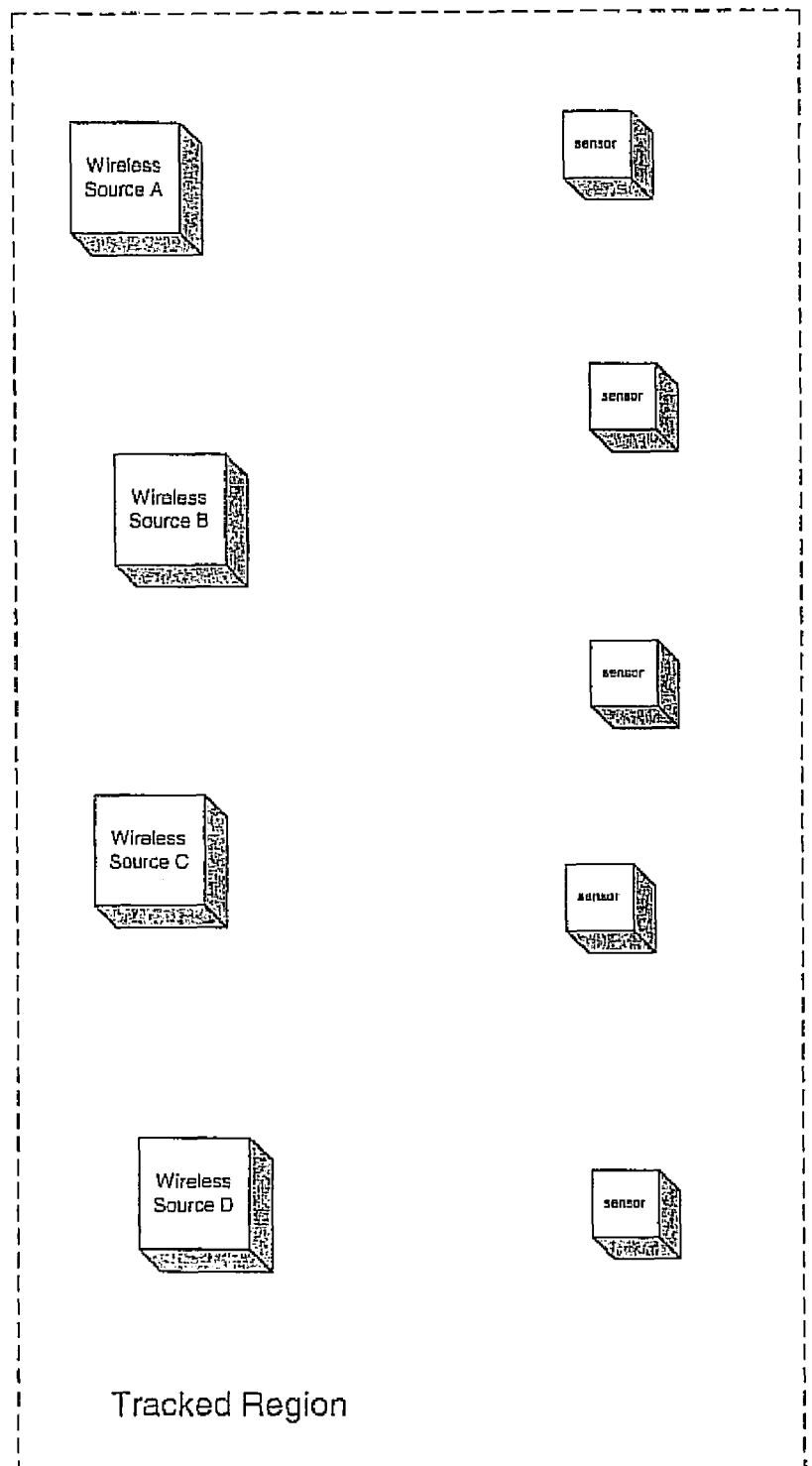
FIG. 3 shows how, if one were to distribute multiple sensors along the periphery of a volume that exceeds the normal source-sensor operating range, then a small, low power source acting as a "sensor" offers the opportunity to track an object over a large volume.
Figure 4:
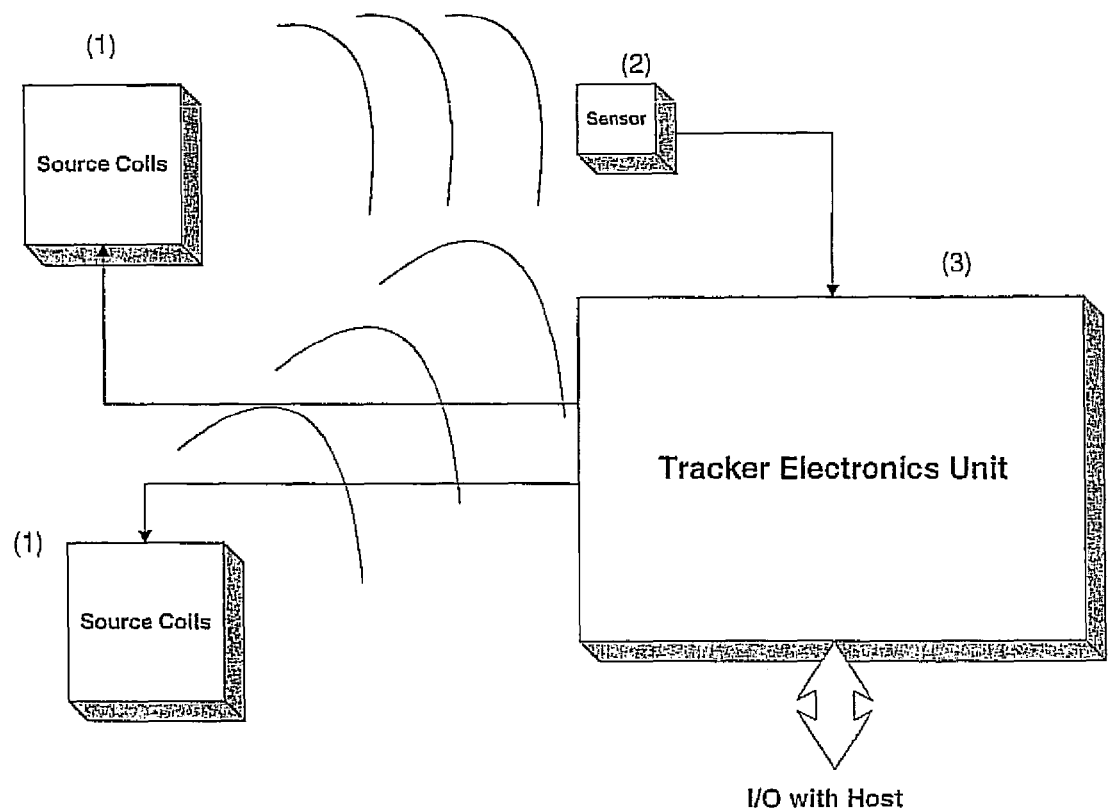
FIG. 4 is directed to the reciprocity of the tracking relationship.
Figure 5:
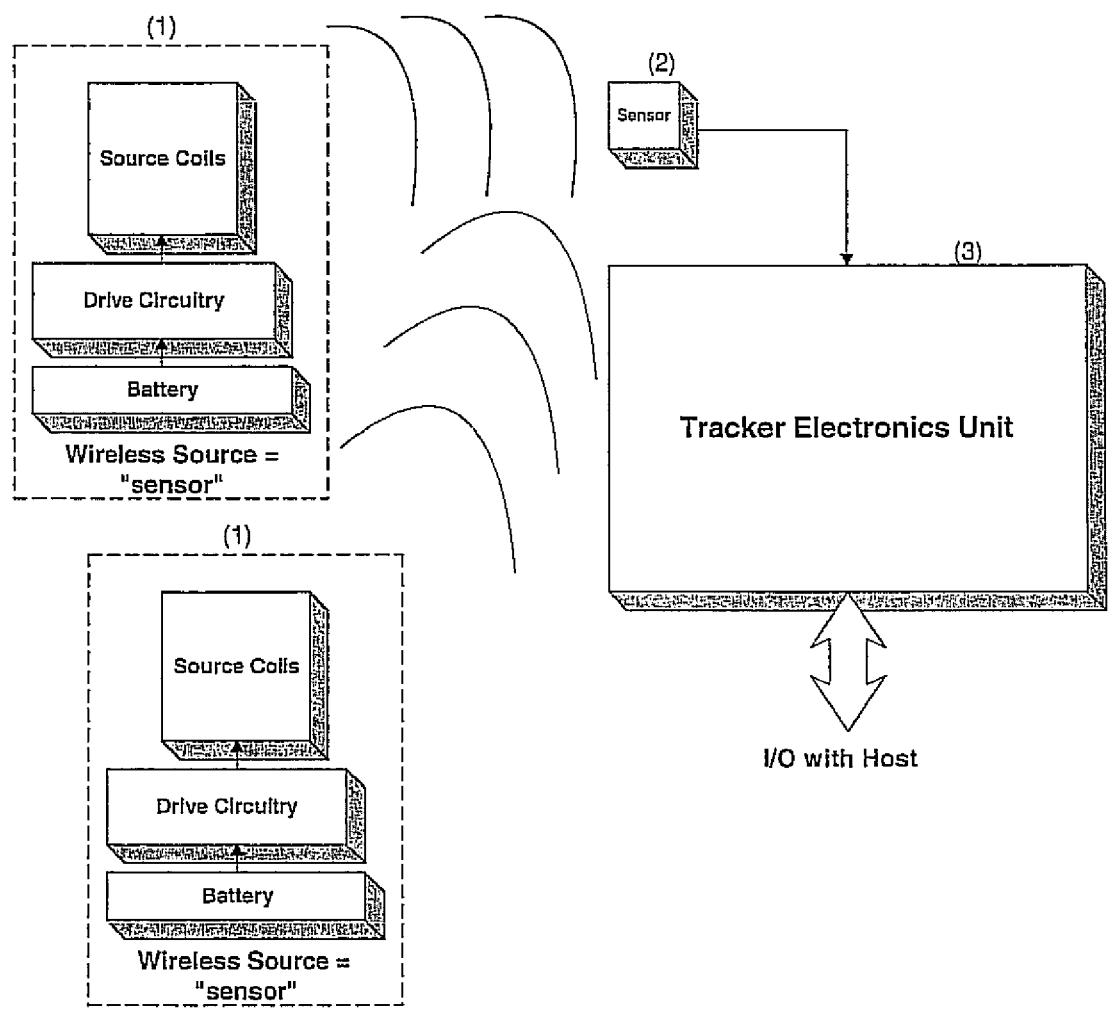
FIG. 5 depicts a wireless source(s) whose signals are detected by a true sensor connected to an electronics unit.

The reciprocity of the tracking relationship is shown in FIG. 4, where two "sensors" (1) are being detected by a single true sensor (2) and processed by tracker electronics (3) for output to a host computer. Furthermore, we could have a wireless source(s) (FIG. 5) as the "sensor" (1), whose signals are detected by a true sensor (2) connected to the electronics unit (3).

The first issue to be resolved when a field source enters the region where tracking is to occur is to determine the operating frequency of the source signal(s). If that source is hardwired into the system and also driven by the electronics unit, the frequency is known. If it is wireless or being driven by other electronics its frequency must be determined. This can be accomplished by using the sensor coils as a probe for detecting energy in the environment. The software resident in the tracker DSP can be made to perform a Fourier analysis of the signals read in to identify if frequency/frequencies in the design set for the system are detected. Only a small portion of the spectrum needs to be analyzed since the candidate operating frequency range always will be known.

The frequency range typically is from a few thousand Hertz to no more than 40 kHz, which does not require a great deal of time to analyze. Digital filtering with the DSP can then be set at the frequencies detected in order to extract the various geometric components of signal coupling from each source coil to each sensor coil. Further, since the set of frequencies existing in the overall system design would always be known, the spectrum scanning can be made very rapid with little concern for aliasing the frequency since only an approximate value is required. The known design frequency nearest the indicated frequency always can be concluded from the indication extracted.

It is important that the signal detection circuitry and algorithm remain efficient because it must run essentially continuously in the background so that the tracker is always able to acquire a source entering the area of a sensor and release a source exiting such an area in real-time. Of course there is the possibility of interfering signals or noise that could lead to a false conclusion so that adequate signal-to-noise margin must be set into the spectrum analysis algorithm as well.

The next problem is to effect synchronism with the source signal(s) in order to optimize data collection. One way of doing this is explained as follows. A typical tracking device generates and samples magnetic fields using data converters whose sampling rate is derived from a single clock source. This is commonly referred to as coherent sampling. One significant advantage of this is that the frequency being detected is exactly the same as the one being generated, and the phase relationship between the current flowing through the magnetic field source and the voltage across the magnetic field sensor is constant and can be easily measured. This is important because the phase relationship is used when computing the transfer function between the sensor voltage and source current, one of the steps in computing position and orientation. It is also the only obstacle to overcome in a non-coherent system once the transfer function is properly computed the subsequent steps are identical to a coherent system.

To understand how a non-coherent system makes up for not knowing the phase relationship, it is helpful to review in detail how a coherent system operates. As previously stated, the requirement is to compute the transfer function between the sensor and source. The tracker DSP measures signals from the source and sensor using a Fourier transform which produces a complex result for each time-series input. This produces two signal matrices V and I where V is a 3×3 sensor voltage matrix and I is a 3×3 source current measurement. Depending on the signal conditioning circuitry, it also may be necessary to adjust the magnitude and phase of either or both results to compensate for fixed delays in the electronics. The result from the source measurement is then multiplied by the matrix $$\begin{bmatrix} j\omega_x & 0 & 0 \\ 0 & j\omega_y & 0 \\ 0 & 0 & j\omega_z \end{bmatrix}$$

to produce the time derivative of the sinusoidal waveforms (j indicating imaginary part or imaginary number $\sqrt{-1}$; $\omega=2\pi f$). At this point the phase differences between the same columns of both matrices are 0 or $\pi$. To compute the transfer function between source and sensor, the sensor matrix V is multiplied by the inverse of the source matrix dI/dt, all operations using complex numbers. The resulting matrix will contain zero (or as close as the system accuracy yields) imaginary components. The signal magnitudes will be in the real component, along with the proper sign. The real components are then used in the subsequent calculations.

In a system where the tracker DSP can only measure the sensor signal (one example of a non-coherent system) the transfer function must be computed where the source current is somehow indirectly determined. The magnitude of the source current can be a certain value either guaranteed by design or determined during the calibration procedure of the source and then loaded into the sensor electronic memory but the correct source phase is still unknown.

The determination of the correct source current phase involves a novel 'process of elimination' to resolve phase ambiguity. Position and orientation (P&O) computation begins with computing the 3 transmitted frequencies as received by each of the 3 receiver coils. This is typically done by a Fourier analysis of several hundred points of time-domain data. For convenience, the resulting 9 elements are arranged in a 3×3 matrix of complex numbers, each row representing one of the receiver coils and each column the transmitted frequency.

$$V = \begin{bmatrix} v_{11} & v_{12} & v_{13} \\ v_{21} & v_{22} & v_{23} \\ v_{31} & v_{32} & v_{33} \end{bmatrix}$$

Rotating the phase of each column by the phase of the corresponding transmitter current effectively zeroes out the imaginary component and applies the correct sign to the real component, Rotating the phase is the process of adjusting each element of the signal matrix above with the corresponding source phase. With the exception of the 0 or $\pi$ ambiguity, the phase of the source is equal to the phase of the sensor divided by j. Each column of the above matrix corresponds to one of the three individual source phases. One element of each column could be used to resolve the phase ambiguity, but it is best to sum all three elements of the matrix column, as in a weighted-average filter, since signal to noise ratio (SNR) limitations can adversely affect computations. Because the elements may have different signs for positive and negative received signals, it is necessary to restrict the complex values to 2 quadrants to avoid canceling out as they are summed. This is allowable since there is already a 180 degree uncertainty. Which 2 quadrants the data is constrained to depend on the relative magnitude of the real and imaginary portions. Failure to observe this precaution will result in erroneous results as the phase is close to a multiple of pi/2 and system noise is greater than the sine or cosine of the phase angle. The 2-quadrant summations of each column of the receiver voltage matrix are computed as follows, where i is the row number and j is the column number.

$$\phi'_j = \sum_{i=1}^{3} \text{sign}(\text{Re}(v_{ij})) \times v_{ij}$$

$$\phi''_j = \sum_{i=1}^{3} \text{sign}(\text{Im}(v_{ij})) \times v_{ij}$$

The real component of $\phi'_j$ is compared to the imaginary component of $\phi''_j$. The summation with the largest term is normalized to unity magnitude and used as the trial phase $\phi''_j$. The following pseudo-code demonstrates this.

if $Re(\phi'_j) > Im(\phi''_j)$ then $\phi''_j = \phi'_j / |\phi'_j|$ else $\phi''_j = \phi''_j / |\phi''_j|$ Given the 180 degree uncertainty of each trial phase, eight combinations are possible, but only one gives the right P&O solution. Four of the possibilities can be eliminated right away because they will produce a phase-adjusted matrix with a negative determinant, which is invalid. Of the remaining four, the three incorrect combinations manifest themselves with P&O solutions that have incorrect signs in the x, y, or z measurements or are rotated 180 degrees in either azimuth, or elevation, or roll. A procedure invoked by the user during system startup resolves the ambiguities. With the receiver to transmitter orientation set to a known condition with very wide tolerances (i.e. ±90 degrees), the tracker computes P&O for all four phase-adjusted matrices. The orientation solution that matches the known condition closest used the adjusted matrix with the 3 correct transmitter phases $\phi_1$, $\phi_2$ and $\phi_3$.

After the initial determination of transmitter phases, they must be continuously updated due to the fact that the phase relationship drifts over time due to the inexactness of time bases of the two systems. To address this problem, for each P&O solution, the trial phases are computed as above. The same uncertainty exists as before, but it can be resolved by using the phase which is more similar to the previous solution's phase. Therefore, no restrictions on movement are needed after initial determination of correct phase.

One consequence of operating wirelessly is that there will be a natural tendency to extend the range of operation between transmitter and receiver. To overcome the weak signals that come with extended range, it is possible to add more transmitters or receivers, whichever type of device remains wired to the electronics unit. For example, if a transmitter is wireless and tracked, several receivers can be distributed about a larger volume. If all receivers are sampled simultaneously, the trial phase summations can run through all receiver signals.

To complete the position and orientation calculation the magnetic moment of the source is determine as follows.

$$M = \begin{bmatrix} m_x \phi_0 & 0 & 0 \\ 0 & m_y \phi_1 & 0 \\ 0 & 0 & m_z \phi_2 \end{bmatrix},$$

where m is the current times the effective area of each source winding. Matrix S, normalized signal matrix, is computed from actual data collected by the tracker DSP as follows.

$S = V \cdot M^{-1}$

Once this normalized signal matrix is created, the teachings of U.S. Pat. No. 4,737,794, incorporated herein by reference, can be used to complete the position and orientation calculation.

In order to track another pseudo-sensor source that may enter the environment of a sensor, the same Fourier analysis to determine frequency is done and same process for determining the phase relationship. When one of these "sensors" moves onward to where another true sensor detects it, the frequency may unavoidably be detected again, but the phase relationship just discovered can be passed along internally from the first sensor. Operation continues in this way as movement passes through the sensors and as the detectable number of pseudo-sensor sources comes into range. The P&O of the pseudo-sensors is computed based on the sensor geometry and the reference point established. The true sensors must be positioned at known P&O from the single reference point in order to do this. Computation of pseudo-sensor P&O can be performed either in the tracker electronics unit or in the host computer.

One additional event occurs when the number of true sensors on a tracking unit is exhausted but additional movement range is desired. Then an additional tracker system with known P&O of its sensors can be added and tied back to the same host computer. The second tracker system simply goes through the same frequency detection process and synchronization as the first system to perform tracking of the pseudo-sensor(s).

A final point for wireless pseudo-sensor sources concerns their characterization matrix. This set of data normally is retrieved at power up from a PROM incorporated in a tracker source or sensor. It is impossible in this case for a wireless source to provide such a characterization PROM, so such data sets must be pre-loaded into the Tracker Electronics Unit (TEU) memory and be retrieved and used whenever the frequency of a particular wireless source is detected. For this reason the best performance will be obtained if a set of wireless pseudo-sensor sources is always associated with the TEU, or TEUs, servicing a given 3D volume.

In summary, we have disclosed a system for detecting non-coherent magnetic signal sources and achieving and maintaining phase synchronization with them without placing any special start-up or harmonic relationships on the source. Further, we have devised a means for extending a string of sensors over a large area to be used successively as the source moves through the sequence of sensors to track low power three-axis field sources without causing distortion via induced eddy currents because of the low level signals involved. The tracker electronics scans for a family of three frequencies per source out of a pre-arranged set intended for the system, computes synchronization, applies characterization data to the signals and computes position and orientation results for output to a host computer. Because of the independent manner in which the tracker determines frequency and then achieves and maintains synchronization, pseudo-sensor sources can achieve operation over even larger spaces than a single tracker can accommodate by concatenating additional tracker systems with their pre-spaced sensors and connecting to the same host computer. Note that a source also can be tracked if it is powered by another system as opposed to being driven by a battery due to the ability to synchronize and achieve coherency. Also, due to the reciprocity between 'sources' and 'sensors' as discussed above, inverse operation is also possible; that is, where it is desirable to synchronize one or more sensors with a source having a known phase.

We claim:

1. A method of resolving phase ambiguity in an AC wireless magnetic tracker system, comprising the steps of:
    providing an electromagnetic receiver having three receiver coils; and providing a processor to perform the following operations:
    computing three transmitted frequencies at the receiver, resulting in nine complex numbers, each with real and imaginary components;
    rotating the phase of each frequency to remove its imaginary component and apply the correct sign to its real component;
    summing the frequencies by restricting the complex values to two quadrants to avoid cancellation, resulting in eight possible phase combinations;
    eliminating the four phase combinations that lead to phase-adjusted matrices with a negative determinant;
    eliminating three of the remaining four possible combinations that lead to phase-adjusted matrices which are rotated 180 degrees in azimuth, elevation, or roll; and
    computing the position and orientation (P&O) of the receiver using the remaining phase-adjusted matrix.

2. The method of claim 1, wherein the step of eliminating three of the four combinations is based upon a procedure invoked during system initialization.

3. The method of claim 2, further including the steps of:
orientating the transmitter and receiver to a known condition with wide tolerances;
computing the P&O for the remaining four possible phase-adjusted matrices; and
using the matrix that with the P&O solution having the best match to the correct transmitter phases.

4. The method of claim 3, wherein the transmitter and receiver are oriented at +90 degrees.

5. The method of claim 3, including the step of arranging the nine complex numbers as a matrix, with rows being indicative of receiver coil and column being indicative of frequency.

6. The method of claim 3, wherein the remaining phase-adjusted matrix is determined by controlling the manufacturing process such that all magnetic sources have the same physical parameters.

7. The method of claim 3, wherein the source is stationary and the receiver is moving.

8. The method of claim 3, wherein the receiver is stationary and the source is moving.

9. The method of claim 1, including the step of updating the identification of the remaining matrix between P&O solutions to compensate for phase drift.

10. A wireless AC magnetic tracking system, comprising:
a source having three source coils, each transmitting a different frequency;
a receiver having three receiver coils; and
processing electronics operative to perform the following functions:
(a) determine the three transmitted frequencies received by the three receiver coils, resulting in nine complex numbers, each with real and imaginary components;
(b) rotate the phase of each frequency to remove its imaginary component and apply the correct sign to its real component;
(c) sum the frequencies by restricting the complex values to two quadrants to avoid cancellation, resulting in eight possible phase combinations;
(d) eliminate the four phase combinations that lead to phase-adjusted matrices with a negative determinant;
(e) eliminate three of the remaining four possible combinations that lead to phase-adjusted matrices which are rotated 180 degrees in azimuth, elevation, or roll; and
(e) computing the position and orientation (P&O) of the receiver using the remaining phase-adjusted matrix.

11. The system of claim 10, wherein the processor is operative to eliminate three of the four combinations based upon a procedure invoked during system initialization.

12. The system of claim 10, wherein the procedure includes the steps of:
orientating the transmitter and receiver to a known condition with wide tolerances;
computing the P&O for the remaining four possible phase-adjusted matrices; and
using the matrix that with the P&O solution having the best match to the correct transmitter phases.

13. The system of claim 12, wherein the transmitter and receiver are oriented at ±90 degrees during the initialization procedure.

14. The system of claim 12, wherein the processor is further operative to update the identification of the remaining matrix between P&O solutions to compensate for phase drift.

15. The system of claim 10, wherein the remaining phase-adjusted matrix is determined by controlling the manufacturing process such that all magnetic sources have the same physical parameters.

* * * * *

UNITED STATES PATENT AND TRADEMARK OFFICE
CERTIFICATE OF CORRECTION

PATENT NO.        : 7,873,491 B2                                    Page 1 of 1
APPLICATION NO.   : 12/017392
DATED             : January 18, 2011
INVENTOR(S)       : Robert F. Higgins et al.

It is certified that error appears in the above-identified patent and that said Letters Patent is hereby corrected as shown below:

Column 1, line number 26, "Foxin" should read --Foxlin--.

Column 2, line number 54, "example," should read --example.--.

Column 6, line number 15, "component," should read --component.--.

Column 6, line number 57, " $\phi''_j = \phi'_j / |\phi'_j|$ " should read -- $\phi'''_j = \phi'_j / |\phi'_j|$ --.

Column 6, line number 61, " $\phi''_j = \phi''_j / |\phi''_j|$ " should read -- $\phi'''_j = \phi''_j / |\phi''_j|$ --.

Column 9, claim number 4, line number 9, "+90" should read --± 90--.

Signed and Sealed this
Thirty-first Day of January, 2012

David J. Kappos
*Director of the United States Patent and Trademark Office*